United States Patent [19]

De Ward et al.

[11] 4,155,119

[45] May 15, 1979

[54] METHOD FOR PROVIDING VIRTUAL ADDRESSING FOR EXTERNALLY SPECIFIED ADDRESSED INPUT/OUTPUT OPERATIONS

[75] Inventors: Robert C. De Ward, Burnsville; Kenneth J. Thurber, Edina, both of Minn.

[73] Assignee: Sperry Rand Corporation, New York, N.Y.

[21] Appl. No.: 835,469

[22] Filed: Sep. 21, 1977

[51] Int. Cl.² ............................................... G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,786,427 | 1/1974 | Schmidt et al. | 364/200 |
| 3,909,798 | 9/1975 | Wallach | 364/200 |
| 4,060,849 | 11/1977 | Bienvenu et al. | 364/200 |

Primary Examiner—Harvey E. Springborn
Attorney, Agent, or Firm—William D. Bauer; Kenneth T. Grace; Marshall M. Truax

[57] ABSTRACT

A method of addressing memory in a digital computer where a plurality of devices are connected to a single input/output channel to the digital computer communicate with the digital computer by externally specifying the memory address of the data word or words to be transferred to or from the digital computer. More specifically, the invention provides a method for treating the externally specified address coming from one of the multiple devices external to the digital computer as a virtual address. Thus, an input/output process operating in the digital computer may operate within the digital computer's system virtual address space. This method allows input/output processes to be able to utilize the address mapping subsystem of the central processor of the digital computer. The method of memory addressing utilizes a subchannel page table for each one of the multiple devices connected to one input/output channel in addition to a channel page table utilized for each individual input/output channel.

7 Claims, 8 Drawing Figures

METHOD FOR PROVIDING VIRTUAL ADDRESSING FOR EXTERNALLY SPECIFIED ADDRESSED INPUT/OUTPUT OPERATIONS

BACKGROUND OF THE INVENTION

The invention pertains to input/output operations in a digital computer and specifically to a method of addressing memory for input/output operations in a digital computer.

In general input/output systems in a digital computer are dependent upon the central processing unit in a digital computer for operatin initiation and for address space allocation. Sometimes this is accomplished by transferring all input/output information from the input/output section of the digital computer to the central processing unit of the digital computer so that the central processing unit may access memory and store or retrieve data to or from memory to facilitate the input/output operation. In this event, the input/output section of the digital computer contains no facility for addressing memory which is separate from the central processing unit's memory addressing capability. Alternatively, input/output operations in a digital computer have been accomplished by allowing the input/output section of a digital computer to have direct access to the memory, an access which is in addition to the central processing unit's memory access. In this case, generally a specific address or plurality of addresses in main memory space are allocated to store certain state information necessary for the proper operation of the input/output channel. For example, at a particular address or particular set of addresses in memory a buffer control word may be stored to which the input/output section of the digital computer may refer to obtain an address to which the input/output section can utilize to buffer data to or from the memory to facilitate input/output operations. Thus, the input/output section of the digital computer has a separate dedicated space in memory which it and it alone may utilize. Generally this separate dedicated address space is fixed and unrelocatable.

Where it is necessary to connect a plurality of external devices to the input/output section of the digital computer generally these devices are connected to a separate input/output channel or subsection of the input/output section of the digital computer. In this event, where the input/output section of the digital computer has direct access to the main memory, each individual channel in the input/output section will have dedicated to it a separate address or set of addresses to utilize to store its buffer control information. Thus, in a multiple channel input/output operation a plurality of addresses or a plurality of sets of addresses are dedicated in main memory specifically for the use of the input/output section.

Where such direct memory access is allowed to the input/output section, the input/output section is generally still dependent upon the central processing unit for the initiation and control of its operations. That is, the central processing unit will supply commands and buffer and state information to the input/output section or to each individual channel within the input/output section. This information will govern, for example, the number of data words to be buffered, the number of bits contained in each data word, and the memory address to which or from which the data word or words are to be buffered. Once the input/output section or individual channel in the input/output section has the state information available the channel is then able to continue to perform the input/output buffering operation independently of the central processing unit.

In some situations it has been found to be necessary to connect a plurality of external devices to a single input/output channel in the input/output section of a digital computer. This is sometimes due to the extreme number of external devices that need to be connected to the digital computer and a general insufficiency in the number of input/output channels available. When multiple devices are connected to one input/output channel it is necessary, of course, to interleave the devices in some manner. Typically, the easiest way to perform this interleave is through a time sharing arrangement. That is, at any given point in time only one of the multiple devices may utilize the input/output channel and all other devices connected to that input/output channel must remain silent. In this way the multiple devices may take their turn and access the input/output channel consecutively.

This multiple connection of external devices to one input/output channel does cause some problem, however, in that generally only one set of state information is provided by a separate dedicated memory space allocation to each individual input/output channel. While multiple devices utilize one input/output channel they must be allowed to buffer into separate and distinct areas of memory. In order to perform this separation and buffering additional provision must be made by the external device in addition to the state information provided by the control processing unit.

One method of providing this additional information is through the use of externally specified addressing. When externally specified addressing is utilized for an input/output channel the external device will supply the input/output channel, in addition to a data word, an address at which to store or retrieve the data to be buffered. This externally specified address then designates the address in main memory to which or from which the data is to be buffered and may be utilized either separately or in conjunction with the state information provided to that input/output channel from the central processing unit.

This type of input/output operation and this type of externally specified addressing with respect to input/output operations is old in the art. An example of this general input/output organization is described and explained in U.S. Pat. No. 3,243,781, C. W. Ehrman, et al, entitled Digital Communication System. An example of this type of externally specified addressing is described in U.S. Pat. No. 3,251,040, R. L. Burkholder, et al, Computer Input-Output System. An understanding of both the Ehrman and Burkholder patents is basic to understanding the operation of the present invention. Accordingly, U.S. Pat. No. 3,243,781 and U.S. Pat. No. 3,251,040 are hereby incorporated by reference.

Understanding the present invention also involves understanding the basis of virtual addressing.

Virtual addressing is a form or a means for providing relative addressing. A virtual address specifies not a fixed location in main memory but rather a relative address in main memory. Virtual addressing is typically utilized or provided in cases where more addressing capability is provided than is necessary in immediate access main memory. In this way memory addressing may be provided for storage which is less direct than the main memory access unit as for example a backup disk, drum, tape or other bulk storage medium.

Heretofore in digital computer systems virtual addressing techniques have generally been confined to memory access involving central processing units. In digital computers where memory access is allowed both the central processing unit and the input/output section, virtual addressing has been provided generally only toward the access of memory provided by the central processing unit. The input/output section access to main memory generally still utilizes real, absolute, fixed main memory addresses. Since real addresses are still utilized by the input/output section, a separate memory space fixed in main memory is allocated to each input/output channel.

One example of a virtual address scheme which may be utilized is described in U.S. Pat. No. 4,128,875, filed Dec. 16, 1976 and issued Dec. 5, 1978, entitled Optional Virtual Memory System by K. J. Thurber, et al. Since the virtual memory system described in this U.S. Patent Application is basic to the understanding of the present invention, it is hereby incorporated by reference.

SUMMARY OF THE INVENTION

The present invention provides a method of applying virtual addressing techniques to input/output memory access operations in a digital computer, specifically to those input/output operations involving externally specified addressing.

The present invention provides an improved method of addressing in a digital computer system of the type having a memory addressed by real address. Further, the digital computer system must have a virtual address system for converting virtual addresses into real addresses utilizing a page table having a predetermined starting address. Still further, the digital computer system must have input/output operations capable of externally specifying an address and having channel state information for indicating a starting address of a channel page table. The first step in the method comprises treating the externally specified address as a virtual address having a page portion and a displacement portion. The second step comprises addressing the channel page table using the starting address of the channel page table. The third step comprises indexing into the channel page table with the page portion to obtain a page frame number. And the final step comprises concatenating the page frame number with the displacement portion to obtain the real address.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENT

Figure 1:
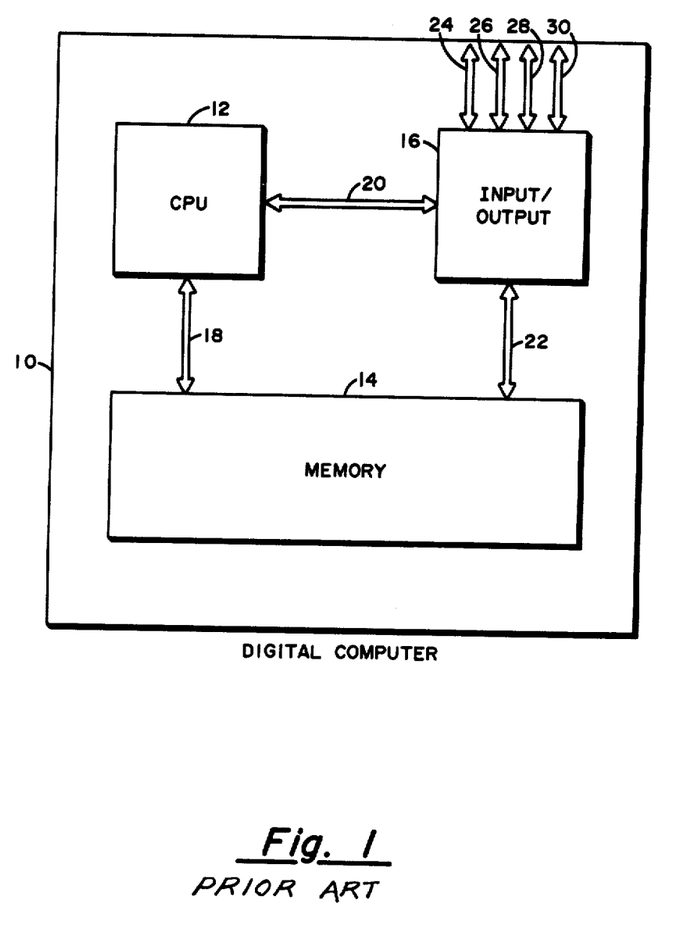
FIG. 1 is a general block diagram showing the basic digital computer structure.

In order to properly understand the basis and function of the present invention it is first necessary to describe the basic functional components of the digital computer. FIG. 1 shows the basic components of a digital computer 10. This general block diagram shows the digital computer 10 broken down into three separate components, a central processor 12, a main memory 14 and an input/output section 16. The central processing unit is the central command and control unit for the entire digital computer and performs all computations and instruction processing. The central processing unit communicates with the main memory 14 by way of data paths 18. The central processing unit 12 may retrieve instructions from main memory 14 and retrieve and store data via communication paths 18. The digital computer 10 is also capable of performing input/output operations and thus contains an input/output section 16. The input/output section 16 is subordinate to and controlled by the central processing unit 12 and communicates with the central processing unit 12 via communication paths 20. The central processing unit 12 supplies the input/output section 16 via communication paths 20 with certain state information relative to initiation and termination of input/output operations and relative to informing the input/output section 16 of particular addresses in main memory 14 into which and from which to buffer data. The input/output section 16 also communicates directly with main memory 14 by way of communication paths 22. In this way the input/output section 16 can store and retrieve data words from and to memory 14 independent of the central processing unit 12, once the central processing 12 has instructed the input/output section 16 on how to proceed. This particular embodiment of a digital computer 10 also shows a plurality of external communication paths 24, 26, 28 and 30. Each of these communication paths represents a port through which an ability is provided to connect with an external device for communication purposes external to the digital computer 10. Each of the communication paths 24 through 30 represent a separate input/output channel within the input/output section 16. This particular embodiment of the digital computer 10 contemplates the use of real addressing from both the central processing unit 12 and the input/output section 16 to main memory 14. This is illustrated by the direct communication path connections 18 and 22, respectively.

Figure 2:
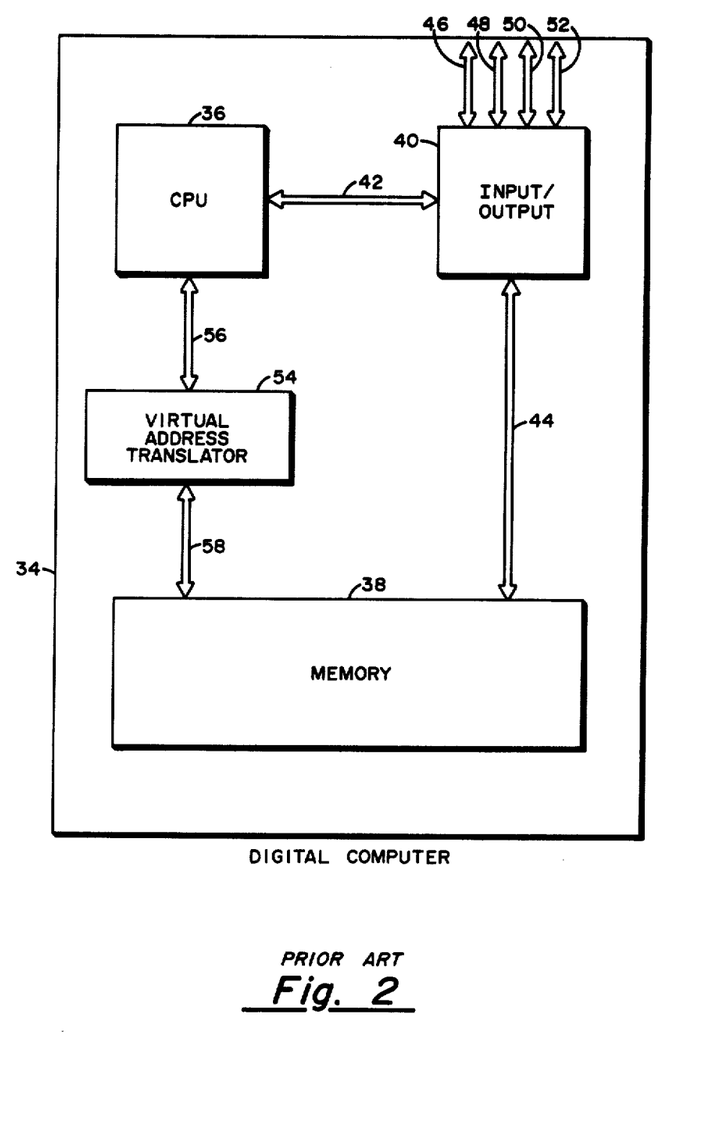
FIG. 2 is a general block diagram showing a general virtual addressing implementation.

FIG. 2 is a general block diagram illustration of another digital computer 34. This general digital computer construction is identical to the digital computer construction in FIG. 1 except for the method of memory addressing. The digital computer 34 in FIG. 2 contains a central processing unit 36, a main memory 38 and an input/output section 40. The central processing unit 36 and the input/output section 40 communicate via communication paths 42. These communication paths 42 are for the same purposes as communication paths 20 in FIG. 1. The input/output section 40 has direct access to main memory 38 via communication paths 44. These communication paths 44 are identical to communication paths 22 in FIG. 1. In addition, the input/output section 40 contains a plurality of input/output channels which are connected to external communication paths 46, 48, 50 and 52. These communication paths are identical to the communication paths 22 through 28 of FIG. 1.

The singular difference in the digital computer 34 in FIG. 2 and digital computer 10 of FIG. 1 is the method of addressing memory. In FIG. 1 it was noted that both the central processing unit 12 and the input/output section 16 referenced main memory 14 with real addresses, the central processing unit 12 via communication paths 18 and the input/output section 16 via communication paths 22. In the digital computer 34 in FIG. 2 the central processing unit 36 communicates with main memory 38 not directly but through a virtual address translator 54. The central processing unit 36 is connected directly to the virtual address translator 54 via communication paths 56. In turn, the virtual address translator 54 is connected to main memory 38 via communication paths 58. The central processing unit 36 then supplies the virtual address translator 54 with a virtual address which in turn is translated and submitted to main memory 38 as a real address. This is in contrast to the addressing of main memory 38 via input/output section 40. The input/output section 40 supplies a real memory address directly to main memory 38.

In this arrangement, the digital computer 34 supports the central processing unit 36 with a virtual addressing system. However, it is recognized that the address system associated with buffered operations in the input/output section is still a real addressing method. This is the digital computer recognized as prior art and from which the present invention has application. Note that although the central processing unit has relative addressing, a specific portion of main memory 38 must be specifically and unalterably allocated to input/output operations because the input/output section 40 is not supported with virtual addressing.

Figure 3:
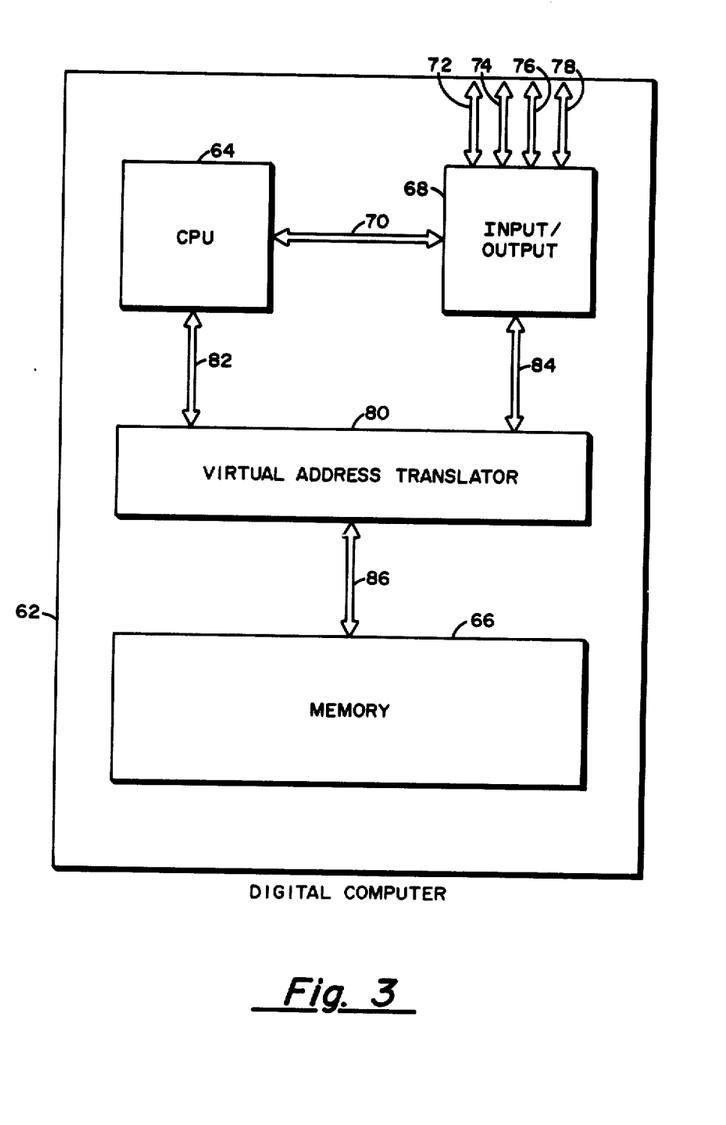
FIG. 3 is a general block diagram showing virtual addressing encompassing input/output operations.

The general block diagram of digital computer 62 in FIG. 3 illustrates that the virtual addressing which was supplied to the digital computer 34 in FIG. 2 can be applied both the central processing units and input/output sections of a digital computer. Digital computer 62 contains the same three main components as did the digital computers in FIGS. 1 and 2. The digital computer 62 contains a central processing unit 64, the main memory 66 and an input/output section 68. Again the central processing unit 64 and the input/output section 68 communicate via communication paths 70. In addition, the input/output section 68 is comprised of a plurality of input/output channels which are individually connected to external communication paths 72, 74, 76 and 78. As in the two previous digital computers the central processing unit 64 and the input/output section 68 have separate addressing capabilities to memory 66. However, the virtual addressing supplied to the central processing unit in the digital computer 62 has been expanded to include the addressing from the input/output section 68. Thus, the addresses supplied by both the central processing unit 64 and the input/output section 68 are translated by the virtual address translator 80. The central processing unit 64 communicates with virtual address translator 80 via communication path 82. Input/output section 68 communicates with virtual address translator 80 via communication paths 84. The virtual address translator 80 takes addresses from both the central processing unit 64 and input/output section 68 and converts them into real addresses which are supplied to main memory 66 along communication paths 86. Note that in this configuration of a digital computer, the addressing by both the central processing unit 64 and the input/output section 68 is virtual. It is no longer necessary to specifically allocate a specific portion of main memory 66 to which the input/output section 68 must communicate. Its addressing is now made relative by virture of the virtual address translator 80.

Figure 4:
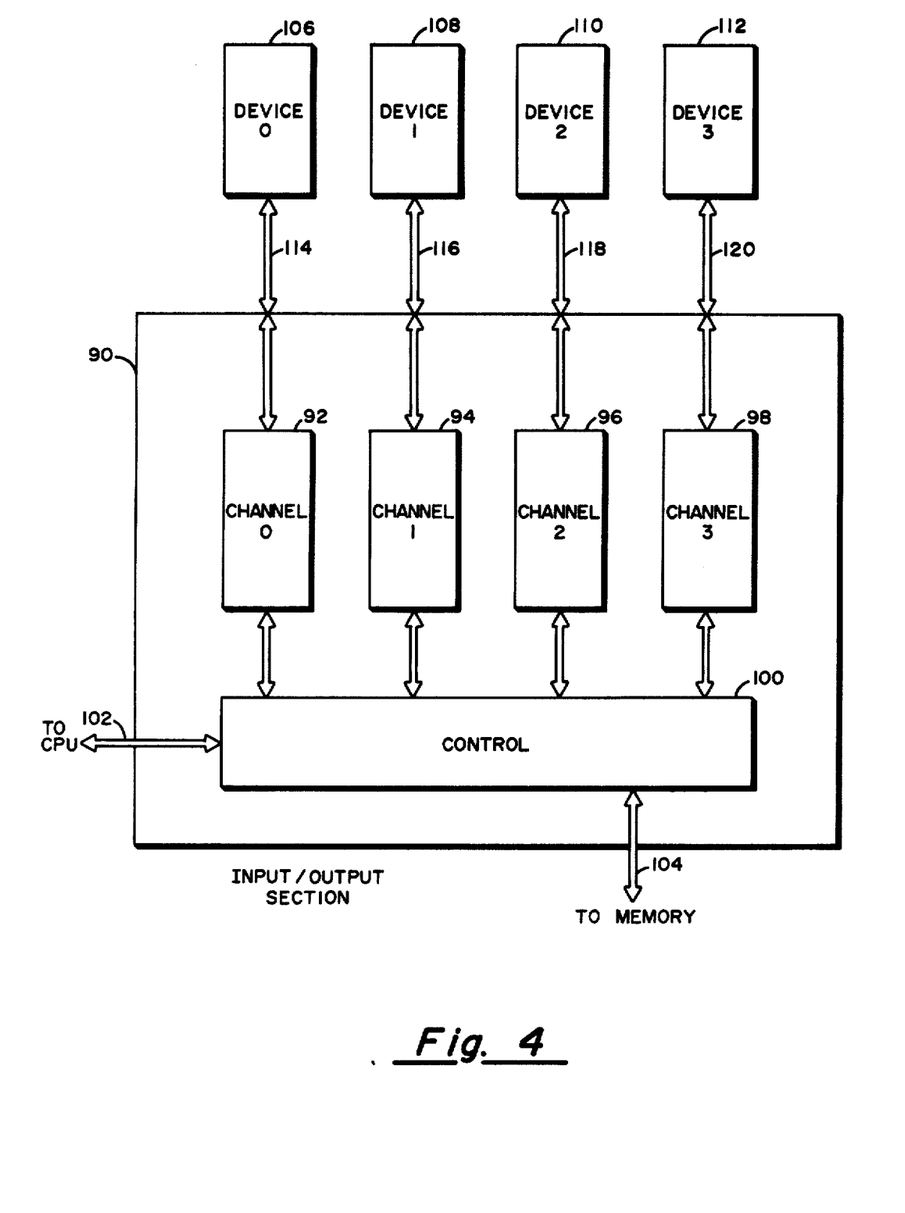
FIG. 4 is a general block diagram showing multiple devices connected to a single digital computer via multiple input/output channels.

FIG. 4 is a general block diagram representing an expanded view of an input/output section of a digital computer. This input/output section 90 consists of a plurality of separate input/output channels 92, 94, 96 and 98. For convenience these have been labeled channel 0, channel 1, channel 2 and channel 3, respectively. Also contained within the input/output section is a common block labeled control 100. This control 100 part of input/output section 90 intefaces with the central processing unit and with main memory (or in the case of virtual addressing with the virtual address translator). This communication is accomplished via communication paths 102 to the central processing unit and via communication path 104 to the memory unit. A plurality of external devices are shown to this input/output section 90. These external devices are numbered with reference numerals 106, 108, 110 and 112. Device 106 is connected to channel 92 via communication paths 114. Device 108 is connected to channel 94 via communication paths 116. Device 110 is connected to channel 96 via communication paths 118. And device 112 is connected to channel 98 via communication paths 120. This figure illustrates one method of connecting a plurality of external devices to a single digital computer. Since the input/output section 90 contains a plurality of input/output channels 92 through 98, it is possible to connect a plurality of external devices 106 through 112 to the digital computer by connecting a single device individually to a single channel.

Figure 5:
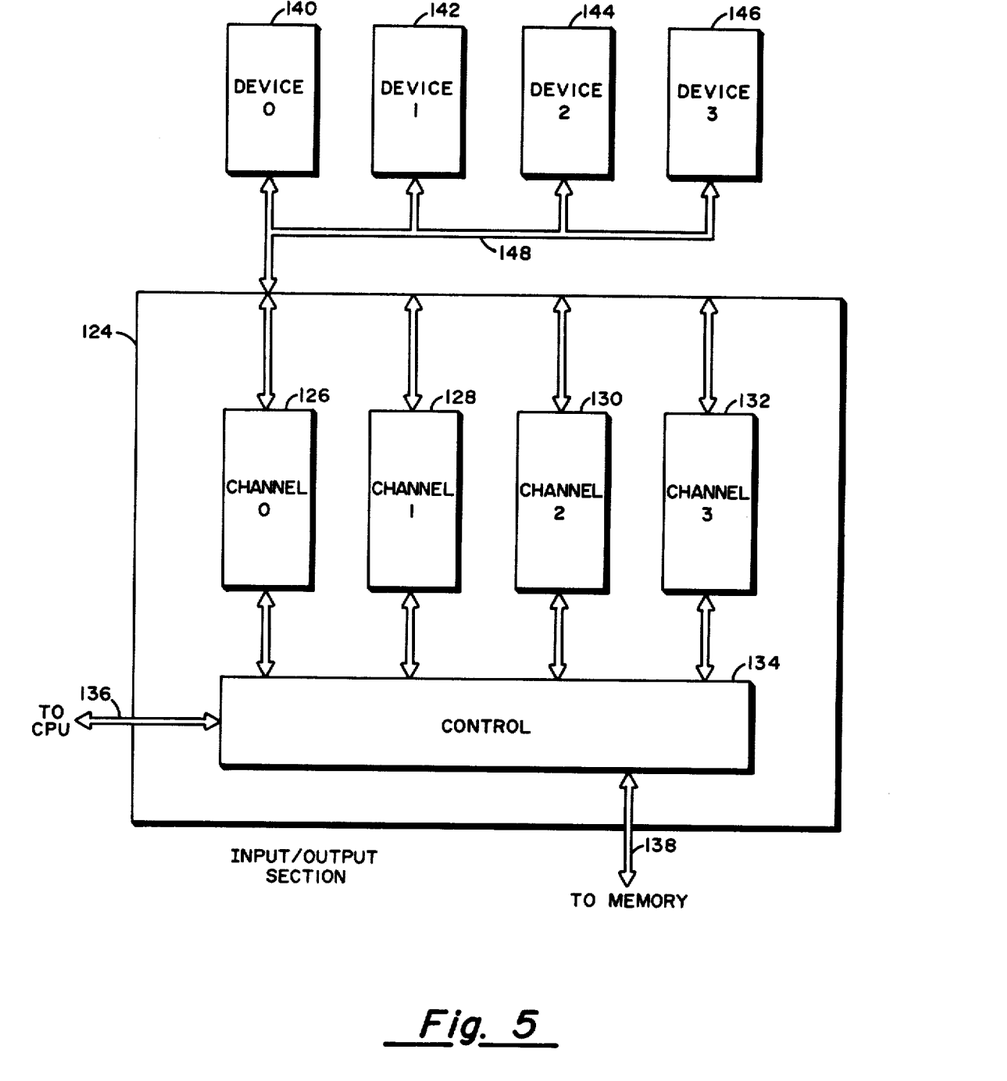
FIG. 5 is a general block diagram showing multiple devices connected to a single digital computer via one input/output channel.

Another method of connecting a plurality of external devices to a single computer, or a necessary method of connecting a plurality of devices when the number of devices exceeds the number of individual channels available, is illustrated in FIG. 5. FIG. 5 is another illustration of an input/output section of a digital computer. Here the input/output section 124 like the input/output section in FIG. 4 is comprised of a plurality of input/output sections 126, 128, 130 and 132. There is a common control part 134 to the input/output section which controls communication with the central processing unit via communication paths 136 and to the main memory unit via communication paths 138. All of these elements of the input/output section 124 in FIG. 5 are identical to the elements in input/output section 90 in FIG. 4. Also in FIG. 5 there is illustrated a plurality of external devices 140, 142, 144 and 146. However, the method of connecting these devices to the input/output section 124 is vastly different in FIG. 5 than in FIG. 4. In FIG. 5, all four of the external devices are connected to input/output channel 126 via communication paths 148. Communication paths 148 colllectively tie all of these communication devices 140 through 146 to the input/output section 124. Thus FIG. 5 illustrates the method of interleaving or time sharing a plurality of external devices to a single input/output channel of a digital computer. FIGS. 1, 2 and 3 have represented three different means of providing addressing for input/output sections of a digital computer. FIGS. 4 and 5 have illustrated two alternatives in connecting a plurality of external digital devices to a single digital computer.

The digital computer arrangement in FIG. 1 is illustrative of the input/output section arrangement described in U.S. Pat. No. 3,251,040, Burkholder, et al, entitled Computer Input-Output System, which patent is hereby incorporated by reference. FIG. 2 is illustrative of the arrangement of a digital computer in which the virtual address translation described in U.S. Pat. No. 4,128,875, filed Dec. 16, 1976 and issued Dec. 5, 1978, Thurber, et al, entitled Optional Virtual Memory System. The general block diagram of FIG. 3 is indicative of the arrangement of a digital computer in which the present invention finds application. FIG. 4 is illustrative of what might be considered normal connection of external devices to a digital computer. FIG. 5 illustrates a method of connecting more than one digital device to a single input/output channel. If such multiple connection is made some method of maintaining address separation between such multiple external digital devices be maintained. Such a method of separating address space is provided in the externally specified addressing technique in U.S. Pat. No. 3,243,781, Ehrman, entitled Digital Communication System.

With this background in mind the present invention will provide a method of supporting the virtual address translation described in FIG. 3 and simultaneously support the input/output connection described in FIG. 5. Thus, the present invention will take aspects of both the virtual address translation system described in the Thurber application and aspects from the Ehrman patent and combine them to provide a method of virtual memory addressing in an externally specified address input/output environment.

Figure 6:
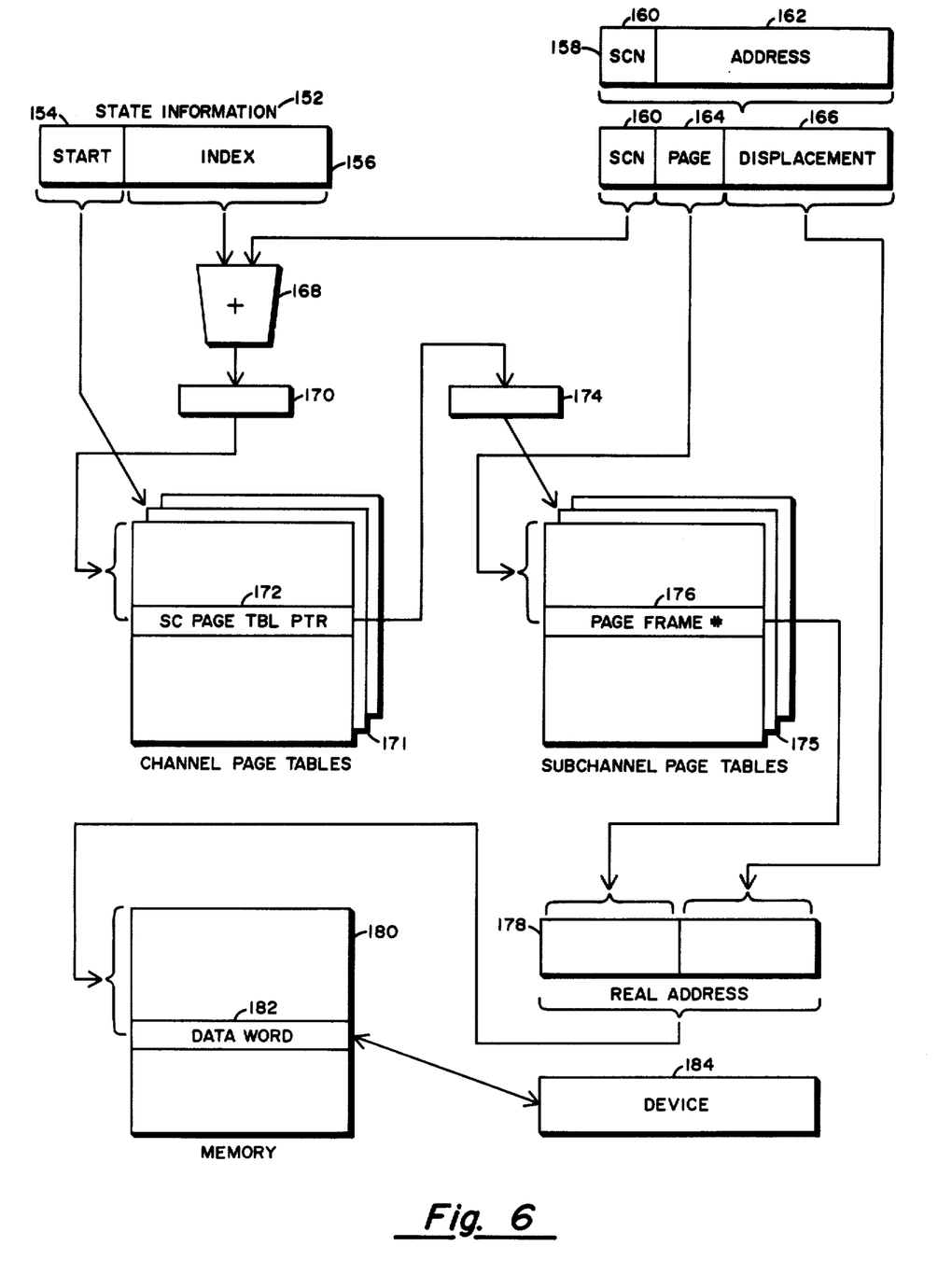
FIG. 6 is a detailed block diagram of implementation of a virtual externally specified addressing technique.

FIG. 6 will illustrate with a detailed block diagram the operation of the method of the present invention involving virtual addressing in an input/output externally specified addressing environment. In FIG. 6 certain state information or channel initiation information has been provided from the central processing unit to the input/output section in the normal manner. That is, in the same manner as the central processing unit would support the input/output section whether virtual addressing was being utilized in the input/output section or whether multiple devices were being multiplexed over one input/output channel. This state information 152 consists of a starting address 154 and an index 156. The starting address 154 is necessary in any environment in which the input/output addressing to memory is relative. The starting address 154 represents a relative location in memory where further input/output state information can be found. In a digital computing system in which the input/output section has a separately allocated dedicated portion of memory the starting address 154 would not be provided in the state information 152 and would be unnecessary. The starting address 154 is shown here to provide for the case where some sort of relative input/output addressing is provided although not necessarily virtual addressing. The index 156 provides information to the input/output section as to what portion of the state information, which is available in the memory as indicated by the starting address 154, is pertinent to the particular input/output channel being utilized. Since this relative location in memory contains state information for all input/output channels capable of being utilized, the index 156 selects only the state information for one input/output channel. In general, the index 156 will consist of the channel number of the input/output channel which is being utilized. The index 156 then merely directs the input/output section to the particular location within the block of state information provided to the input/output section which is applicable to the particular input/output channel being utilized.

Also provided in FIG. 6 is device information 158 which is provided from the external device. In the externally specified addressing situation the external device, in addition to the data word, will transmit to the input/output section of the digital computer a subchannel number 160 indicating a particular one of the plurality of digital devices connected to the single input/output channel and an address 162. The address 162 represents the address to which or from which the input/output section is to transfer data to or from memory. It is important to note that both the subchannel number 160 and the externally specified address 162 are provided by the external digital device.

The externally specified address 162 is broken into two separate components. Since the address is translated as a virtual address, the externally specified address 162 is broken into a page identifier 164 and a displacement 166. The subchannel number 160 portion of the device information 158 supplied by the external digital device is utilized directly. The subchannel number 160 is added to the index 156 in a binary adder 168. The result of the addition of the index 156 and the subchannel number 160 is transferred to register 170.

The starting address 154 from the state information 152 provided by the central processing unit is used to select one of a plurality of channel page tables. These tables are identical to the page tables referred to in the incorporated Thurber application. These tables may be located in main memory, requiring a separate memory reference to obtain the information therein or may be separate general registers. In either case, starting address 154 provides the starting point of a particular channel page table 171 relating to the input/output channel in use. This channel page table 171 is then indexed into utilizing the result from register 170 of the addition of index 156 and subchannel 160. This indexing into the channel page table 171 will bring us to a memory location which contains a subchannel page table pointer 172. This subchannel page table pointer 172 is then retrieved from the channel page table 171 and placed in register 174. This subchannel page table pointer 172 contained in register 174 then is utilized to select one of the plurality of subchannel page tables. There would exist one subchannel page table for each of the external devices connected to this particular channel. Again, the subchannel page tables may be located in main memory or in the alternative be a separate general register set. An index is made into the selected subchannel page table 175 utilizing the page identifier 164. This will select a single memory location containing a page frame number 176. The page frame number 176 is retrieved from the subchannel page table 175 and is concatenated with the displacement 166. The concatenated page frame 176 and displacement 166 is then placed in register 178. The contents of register 178 represents the real address for which the input/output section will address memory 180. With this absolute address a reference is made into main memory 180 to select a particular location containing the data word 182. On an output transfer the data word is selected from the data word location 182 in main memory 180 and transferred directly to the external device 184. If the input/output operation was an input transfer the data word would be transferred from the external device 184 and transferred into the data word location 182 in main memory 180.

Thus, it can be seen that an improved method of addressing memory is facilitated using the method of the present invention. The method obtains advantages both from the use of the virtual addressing system described in the Thurber application and in the externally specified addressing technique described in the Ehrman patent and is supported by the input/output description contained in the Burkholder patent. This improved method of addressing memory utilizing the virtual addressing techniques and externally specified addressing techniques has advantages and improvements not contemplated by either. By utilizing virtual addressing for the input/output operations a separate dedicated portion of main memory need not be set aside to be utilized by the input/output section of the digital computer only. Further, by the incorporation of the externally specified addressing into the normal virtual addressing system of a digital computer the input/output operations may utilize the address mapping system of the central processor and further and more importantly utilize the memory protection subsystem contained in the central processor. This provides significant advantage in today's security conscious environment.

Figure 7:
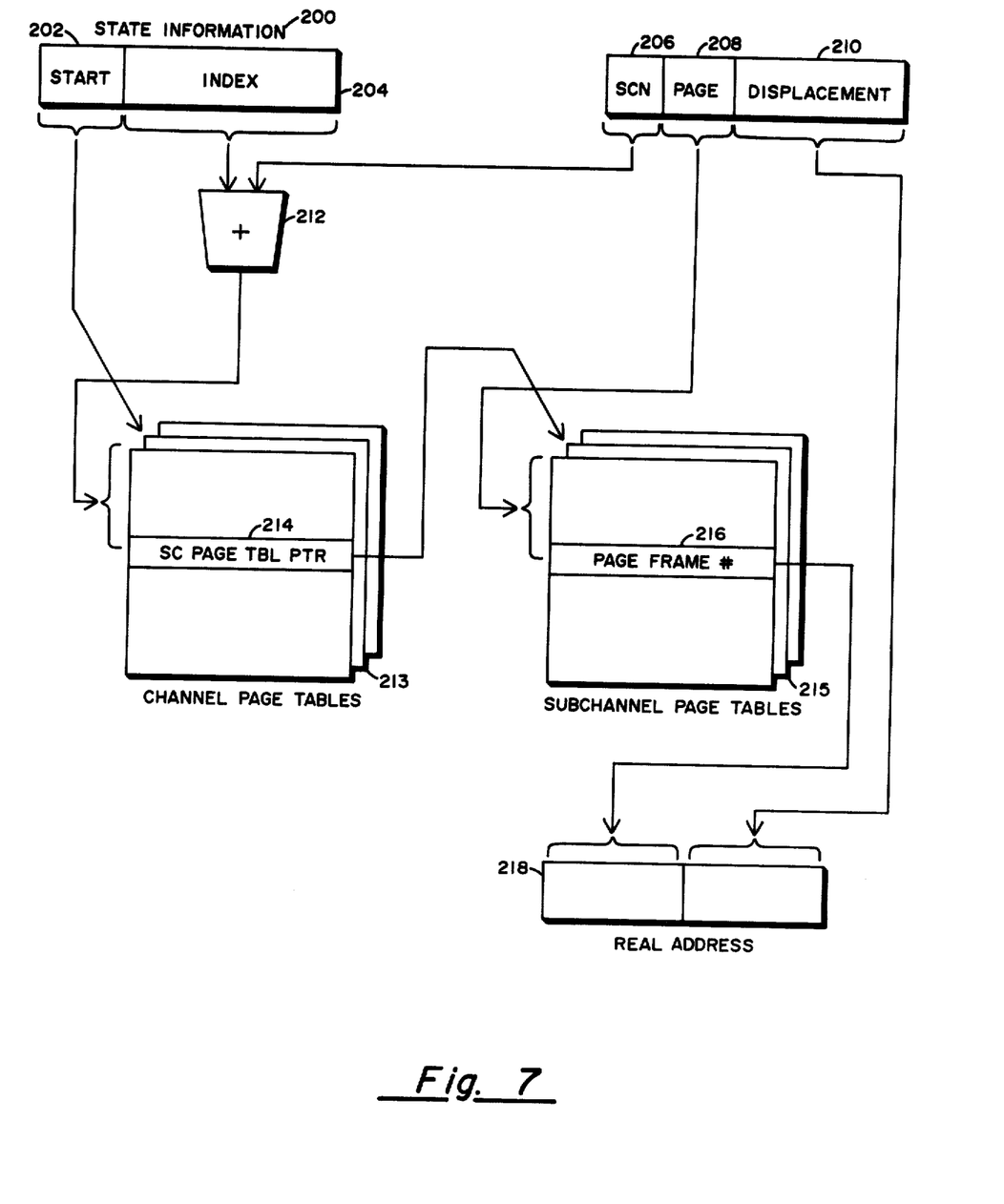
FIG. 7 is a simplified detailed block diagram of implementation of a virtual externally specified addressing technique.

A simplified version of the method of memory addressing of the present invention is illustrate in FIG. 7. In FIG. 7 the same state information 200 that was provided by the central processing unit in FIG. 6 is again provided. This state information 200 consists again of a starting address 202 and an index 204. The information provided by the external device consists of a subchannel number 206, a page identifier 208 and a displacement 210. Again, the subchannel number 206 is added to the index 204 in a binary adder 212. A channel page table 213 is selected with the starting address 202 and an index is made thereto by the result of the addition of the subchannel number 206 and the index 204. This will give rise to a particular memory location which contains a subchannel page table pointer 214. This subchannel page table pointer 214 is used to directly address and select one of a plurality of subchannel page tables 215. An index is made into the selected one of the subchannel page tables 215 with the page identifier 208. This will select the particular memory location which contains a page frame number 216. The page frame number 216 is concatenated with the displacement 210 and inserted into register 218. The information contained in 218 resulting from the concatenation of the page frame number 216 and displacement 210 is the real address for which memory would be accessed from the input/output section of the digital computer. The only modifications made in FIG. 7 from FIG. 6 are the elimination of intermediate registers for storing intermediate results such as the addition of the index 204 in subchannel 206 and in storing the subchannel page table pointer 214.

Figure 8:
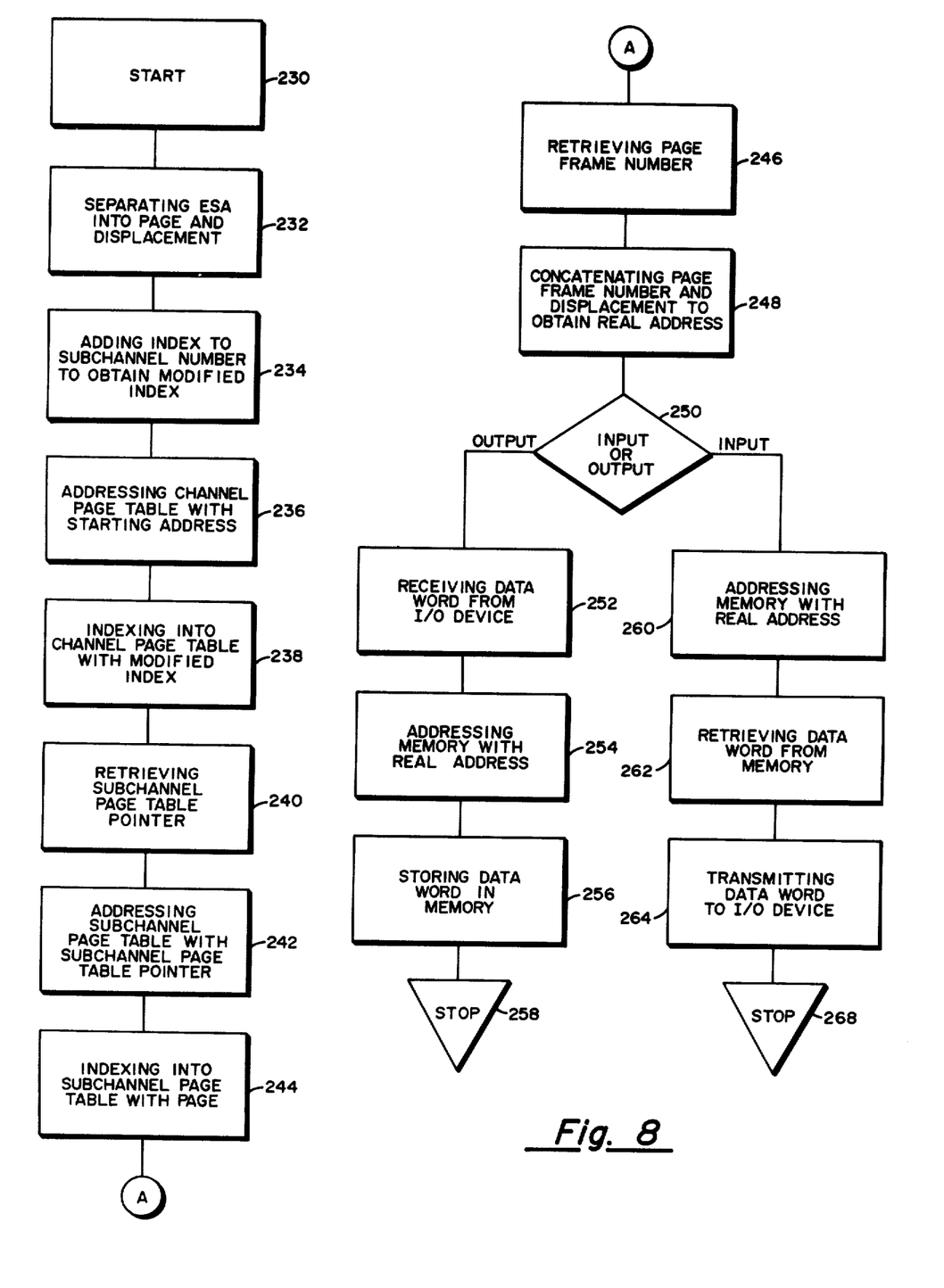
FIG. 8 is a flow diagram showing details of the addressing method.

A complete description of the improved method may be illustrated by reference to the flow chart of FIG. 8. This flow diagram starting in block 230 represents the improved method of addressing memory of the present invention. First, the externally specified address from the digital device is separated into a page identifer and a displacement in block 232. In block 234 the index is added to the subchannel number supplied by the external device to obtain a modified index. In block 236 the channel page table is addressed using the starting address supplied by the channel state information. In block 238 an index is made into the channel page table utilizing the modified index obtained in block 234. This will give a specific location in a selected channel page table which will contain a subchannel page table pointer. In block 240 subchannel page table pointer is retrieved from the channel page table. The subchannel page table pointer is then utilized to address a subchannel page table in block 242. In block 244 an index is made into the selected subchannel page table with the page identifier obtained in block 232. This will give a specific location in a selected subchannel page table which will contain a page frame number. In block 246 the page frame number is retrieved from the subchannel page table and in block 248 is concatenated with the displacement obtained in block 232 to obtain a real address for main memory.

The next operaton depends upon whether the input/output transfer is an input transfer or an output transfer as illustrated by decision block 250. If the transfer is an output transfer, the data word is received from the external device in block 252. Main memory is addressed in block 254 with the real address obtained in block 248. The data word obtained from block 252 is then stored in the memory location addressed by block 254. And the process would stop as is indicated by block 258. If the input/output transfer is an input transfer the main memory would be addressed in block 260 with the real address obtained from block 248. The data word would be retrieved from main memory in block 262 and would be transferred to the external device in block 264 which would end, block 268 the input transfer.

Thus, it can be seen the improved method of memory addressing of the present invention utilizes one page table for each channel contained in the input/output section and in addition utilizes one page table called a subchannel page table. For each external device connected to a single input/output channel, these page tables, designated a channel page table and a subchannel page table, are then addressed consecutively in a two step method to obtain the page frame number. However, much of the process is identical to the virtual addressing system described in the Thurber application.

Thus, it can be seen that there has been shown and described a novel method for addressing memory. It is to be understood, however, that various changes, modifications and substitutions in the form of the details of the described method can be made by those skilled in the art without departing from the scope of the invention as defined by the following claims.

What is claimed is:

1. In a digital computer system of the type having a memory addressed by a real address, having a virtual addressing system for converting virtual addresses into real addresses utilizing a channel page table having a predetermined starting address, having input/output operations, having said input/output channels capable of externally specifying an address, and having channel state information which specifies a starting address of said channel page table, an improved method of addressing comprising the steps of:

treating said externally specified address as a virtual address having a page portion and a displacement portion;

addressing said channel page table using said starting address of said channel page table;

indexing into said channel page table with said page portion to select a particular location within said channel page table in order to obtain a page frame number which specifies the real address of the start of said page portion in said memory; and concatenating said page frame number with said displacement portion to obtain said real address.

2. A method as in claim 1 wherein said input/output operations include an output data transfer for transferring a data word from a location in said memory addressed by said real address to a device connected to said input/output channel and further comprising the steps of:

addressing said memory using said real address to obtain said data word;

retrieving said data word from said memory; and transferring said data word to said device.

3. A method as in claim 1 wherein said input/output operations include an input data transfer for transferring a data word from a device connected to said input/output channel to a location in said memory addressed by said real address and further comprising the steps of:

receiving said data word from said device;

addressing said memory using said real address to obtain said data word; and storing said data word in said memory.

4. In a digital computer system of the type having a memory addressed by a real address, having a virtual addressing system for converting virtual addresses into real addresses utilizing a channel page table having a predetermined starting address, having input/output operations, having a plurality of devices multiplexed over one of a plurality of input/output channels, having said input/output channels capable of externally specifying an address having a subchannel number portion and an address portion, and having channel state information which specifies a starting address of said channel page table, an improved method of addressing comprising the steps of:

treating said address portion of said externally specified address as a virtual address having a page portion and a displacement portion;

addressing said channel page table using said starting address of said channel page table;

indexing into said channel page table using said subchannel number portion to select a particular location within said channel page table in order to obtain a subchannel page table pointer which specifies the starting address of a subchannel page table;

retrieving said subchannel page table pointer from said channel page table;

addressing said subchannel page table using said subchannel page table pointer as the starting address;

indexing into said subchannel page table with said page portion to select a particular location within said subchannel page table in order to obtain a page frame number which specifies the start of said page portion in said memory;

retrieving said page table number from said subchannel page table; and concatenating said page frame number with said dispacement portion to obtain said real address.

5. A method as in claim 4 wherein said input/output operations include an output data transfer for transferring a data word from a location in said memory addressed by said real address to one of said plurality of devices and further comprising the steps of:

addressing said memory using said real address to obtain said data word;

retrieving said data word from said memory; and transferring said data word to said one of said plurality of devices.

6. A method as in claim 4 wherein said input/output operations include an input data transfer for transferring a data word from one of said plurality of devices to a location in said memory addressed by said real address and further comprising the steps of:

receiving said data word from said one of said plurality of devices;

addressing said memory using said real address to obtain said data word; and storing said data word in said memory.

7. In a digital computer system of the type having a memory addressed by a real address, having a virtual addressing system for converting virtual addresses into real addresses utilizing a channel page table having a predetermined starting address, having input/output operations, having a plurality of devices multiplexed over one input/output channel, having said input/output channels capable of externally specifying an address having a subchannel number portion and an address portion, and having channel state information which specifies a starting address of said channel page table and which specifies an index into said channel page table, an improved method of addressing comprising the steps of:

treating said address portion of said externally specified address as a virtual address having a page portion and a displacement portion;

adding said index into said channel page table with said subchannel number to obtain a modified index;

addressing said channel page table using said starting address of said channel page table;

indexing into said channel page table using said modified index to select a particular location within said channel page table in order to obtain a subchannel page table pointer which specifies the starting address of a subchannel page table;

retrieving said subchannel page table pointer from said channel page table;

addressing said subchannel page table using said subchannel page table pointer as the starting address;

indexing into said subchannel page table with said page portion to select a particular location within said subchannel page table in order to obtain a page frame number which specifies the start of said page portion in said memory;

retrieving said page frame number from said subchannel page table; and concatenating said page frame number with said displacement portion to obtain a real address.

* * * * *

UNITED STATES PATENT AND TRADEMARK OFFICE
CERTIFICATE OF CORRECTION

PATENT NO. : 4,155,119
DATED : May 15, 1979
INVENTOR(S) : Robert C. DeWard, et al It is certified that error appears in the above-identified patent and that said Letters Patent are hereby corrected as shown below:

IN THE PRINTED PATENT

Column 11, Line 60, "dispacement" should be

-- displacement --.

Signed and Sealed this

Second Day of October 1979

[SEAL]

Attest:

RUTH C. MASON
Attesting Officer

LUTRELLE F. PARKER
Acting Commissioner of Patents and Trademarks